(12) United States Patent
Bellorado et al.

(10) Patent No.: US 11,314,423 B2
(45) Date of Patent: Apr. 26, 2022

(54) SYNC-MARK DETECTION ERROR RECOVERY

(71) Applicant: Seagate Technology LLC, Fremont, CA (US)

(72) Inventors: Jason Bellorado, San Jose, CA (US); Deepak Sridhara, Longmont, CO (US); Kinman Ng, San Jose, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 64 days.

(21) Appl. No.: 17/000,136

(22) Filed: Aug. 21, 2020

(65) Prior Publication Data

US 2022/0057941 A1 Feb. 24, 2022

(51) Int. Cl.
| | |
|---|---|
| *G06F 11/00* | (2006.01) |
| *G06F 3/06* | (2006.01) |
| *G06F 11/16* | (2006.01) |
| *G06F 11/14* | (2006.01) |
| *G06F 11/07* | (2006.01) |

(52) U.S. Cl.
CPC .......... *G06F 3/0619* (2013.01); *G06F 3/0659* (2013.01); *G06F 3/0673* (2013.01); *G06F 11/076* (2013.01); *G06F 11/1471* (2013.01); *G06F 11/1658* (2013.01)

(58) Field of Classification Search
None
See application file for complete search history.

(56) References Cited

U.S. PATENT DOCUMENTS

| | | | |
|---|---|---|---|
| 6,411,452 B1 | 6/2002 | Cloke | |
| 7,957,370 B2 | 6/2011 | Behrens et al. | |
| 8,255,764 B1 | 8/2012 | Yeo et al. | |
| 8,817,405 B1* | 8/2014 | Dhanda | G11B 5/59655 360/51 |
| 9,397,698 B1 | 7/2016 | Burd et al. | |
| 9,928,854 B1 | 3/2018 | Jury et al. | |
| 2008/0109697 A1* | 5/2008 | Ho | H03M 13/13 714/755 |
| 2009/0249161 A1* | 10/2009 | Chiba | G11B 20/10222 714/752 |

(Continued)

*Primary Examiner* — Mujtaba M Chaudry
(74) *Attorney, Agent, or Firm* — Holzer Patel Drennan

(57) ABSTRACT

Sync-mark (SM) detection recovery techniques for HDDs tend to be slow and cumbersome. Typical approaches often require an entire read command to be aborted and multiple subsequent read commands with significant firmware intervention. Should a data sector be unreadable, an example recovery technique for HDDs is recursive read averaging (RRA). Using RRA, samples for failed sector reads are stored in memory. When a sector is subsequently read, the samples are averaged and replace the prior sample stored in memory. The averaged samples are then used to decode the sector. Should SMs associated with data fragments making up a sector be unreadable, the data fragments are unreadable, rendering the sector unreadable. The systems and methods described herein are used to recover previously unreadable SMs. When updated data fragments are subsequently recombined, the confidence level in the overall sector is improved, which increases the likelihood of a successful decode of the sector.

20 Claims, 7 Drawing Sheets

(56) References Cited

U.S. PATENT DOCUMENTS

2011/0080668 A1* 4/2011 Parthasarathy .. G11B 20/10027
360/48
2017/0083416 A1* 3/2017 Richardson ......... G06F 11/2094
2020/0004701 A1* 1/2020 Subbarao .............. G06F 3/0656

* cited by examiner

400

| Example | $D'_{v,fw}(k+1)$ | $D_{v,fw}(k)$ | $s_{v,fw}(k+1)$ | $D_{v,fw}(k+1)$ |
|---|---|---|---|---|
| 1 | 1 | 1 | miso_out | 1 |
| 2 | 1 | 0 | $s'_{v,fw}(k+1)$ | 1 |
| 3 | 0 | 1 | $s_{v,fw}(k)$ | 1 |
| 4 | 0 | 0 | $s'_{v,fw}(k+1)$ | 0 |

FIG. 4

| Example | $D'v,fw(k+1)$ | $Dv,fw(k)$ | $sv,fw(k+1)$ | $Dv,fw(k+1)$ | Indicator Comparison |
|---|---|---|---|---|---|
| 1 | $D'v,fw(k+1) \geq T1$ | $Dv,fw(k) \geq T2$ | miso_out | $f(D'v,fw(k+1),Dv,fw(k))$ | n/a |
| 2 | $D'v,fw(k+1) \geq T1$ | $Dv,fw(k) < T2$ | $s'v,fw(k+1)$ | $D'v,fw(k+1)$ | n/a |
| 3 | $D'v,fw(k+1) < T1$ | $Dv,fw(k) \geq T2$ | $sv,fw(k)$ | $Dv,fw(k)$ | n/a |
| 4 | $D'v,fw(k+1) < T1$ | $Dv,fw(k) < T2$ | $s'v,fw(k+1)$ | $D'v,fw(k+1)$ | $D'v,fw(k+1) \geq Dv,fw(k)$ |
| 5 | $D'v,fw(k+1) < T1$ | $Dv,fw(k) < T2$ | $sv,fw(k)$ | $Dv,fw(k)$ | $D'v,fw(k+1) < Dv,fw(k)$ |

SYNC-MARK DETECTION ERROR RECOVERY

BACKGROUND

Data stored on a hard-disk drive (HDD) is retrieved by demodulating a signal induced by passing a magneto-resistive read-head over its location on a magnetic media. The demodulation process is conducted by the embedded Controller System-on-a-Chip (SoC), which detects a specified data sequence (referred to herein as a sync-mark) that is written immediately preceding a data sector. The SoC synchronizes its clock to a pattern written before the sync-mark, an operation used to reliably perform sync-mark detection. Accurate and consistent sync-mark detection is critical as it is not possible to recover the data sector without correct sync-mark detection.

While in many circumstances the sync-mark is easily detected, there are scenarios where this is not the case (e.g., media defects, read operations occurring significantly offset from the written data location, and destructive encroachment of writes conducted on adjacent tracks). Accordingly, error-recovery procedures exist to attempt recovery from sync-mark detection failures (e.g., re-reading a sector with a relaxed detection threshold, re-reading a sector with a modified head position, and using multiple error-correction attempts with shifted versions of the acquired samples).

Existing sync-mark detection recovery techniques tend to be slow and cumbersome to carry out. Typical approaches often require an entire read command (potentially consisting of many sectors) to be aborted and multiple subsequent read commands with significant firmware intervention to conduct. Such procedures can also lead to sync-mark detection failures in additional data sectors which, then, may require further sync-mark detection recovery procedures. As a result, it is generally accepted that sync-mark detection failures incur lengthy recovery times.

Techniques for recovering from sync-mark detection failures with fewer or none of the shortcomings of existing methods are contemplated herein.

SUMMARY

Implementations described and claimed herein address the foregoing problems by providing a data recovery method for a hard disc drive (HDD). The method comprises dividing a sector on a storage platter within the HDD into one or more data fragments, each with an associated sync-mark (SM); reading the sector from the storage platter, wherein a decoding operation on the sector fails; placing a sample of each of the data fragments, each with the associated SM, in memory; re-reading the data fragments from the storage platter; and replacing one or more of the sample data fragments with updated sample data fragments based on the re-read data fragments in the memory.

Implementations described and claimed herein further address the foregoing problems by providing a hard disc drive (HDD) comprising a storage platter divided into sectors, wherein a sector is further divided into one or more data fragments, each with an associated sync-mark (SM). The HDD further comprises a controller to read the sector from the storage platter, attempt and fail in decoding the read sector, and re-read data fragments comprising the sector from the storage platter. The HDD further comprises an SM detection error recovery module to place a sample of each of the read data fragments, each with the associated SM, in memory, and replace one or more of the sample data fragments with updated sample data fragments based on the re-read data fragments in the memory.

Other implementations are also described and recited herein.

BRIEF DESCRIPTION OF THE DRAWINGS

FIG. 4 illustrates a table of example data fragments, each with an associated SM detection status, stored in memory of an SM detection error recovery module.

DETAILED DESCRIPTION

An increasingly large (and growing) segment of hard disc drive (HDD) usage is in data centers. For the sake of access time and reliability, data centers often do not rely on a single copy of stored data and may require multiple copies of data to be geographically separated to account for events such as natural disasters. Given the potential duplicate storage of data, often in disparate locations, command completion time (CCT) is a metric that is becoming increasingly important for storage devices used in data center applications. CCT only permits a fraction of commands to take longer than a specified time period for completion. An example CCT requirement may be that no more than 1 in 10,000 commands may take longer than 50 ms to complete. A system optimizing CCT may, if a read command is taking too long, access another copy of the requested data rather than delaying subsequent read operations for completion of the initial read request.

Sync-mark (SM) detection failures may also induce CCT failures, particularly where the SM detection failures trigger lengthy SM detection recovery techniques, as is common in the current state of the art. The presently disclosed technology efficiently manages SM detection failures, including multiple failures within a read command and failures for multiple fragments within a sector, in conjunction with the recovery of sectors not triggering SM detection errors. Application of the presently disclosed technology allows for the efficient recovery of sectors failing SM detection for a multitude of reasons, thus providing appreciable impact to the CCT performance of HDDs.

Figure 1:
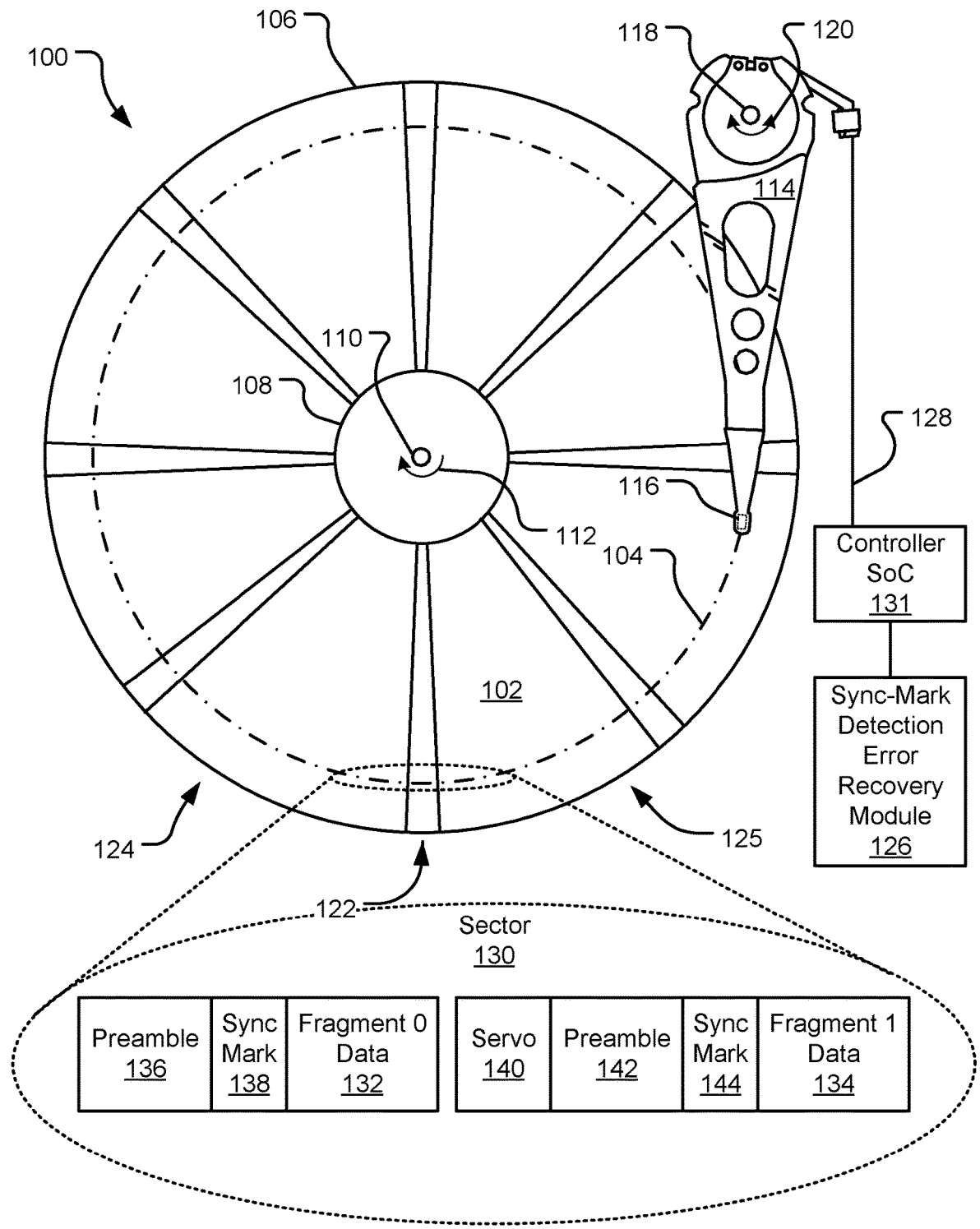
FIG. 1 illustrates an example hard disc drive (HDD) including a storage platter (or disc) having a series of spaced servo wedges and data wedges and a sync-mark (SM) detection error recovery module.

FIG. 1 illustrates an example hard disc drive (HDD) 100 including a storage platter (or disc) 102 having a series of spaced servo wedges (e.g., servo wedge 122) and data wedges (e.g., data wedge 124) and a sync-mark (SM) detection error recovery module 126. The storage platter 102 includes an outer diameter 106 and an inner diameter 108 between which are a number of substantially circular concentric data tracks making up an entirety of the readable and/or writable surface area of the storage platter 102. Specific locations on the storage platter 102 may be defined by any available addressing scheme (e.g., cylinder-head-sector (CHS) addressing and logical block addressing (LBA) schemes). The storage platter 102 rotates at high speed about platter spindle 110 (as illustrated by arrow 112) as information is written to and/or read from data tracks (e.g., track 104) on the storage platter 102.

Information may be written to and read from the storage platter 102 via the actuator arm 114 and its respective slider 116. More specifically, the actuator arm 114 pivots about actuator spindle 118 using a first servo motor (or voice-coil motor (VCM), not shown) during a seek operation to locate the data track 104 on the storage platter 102, as illustrated by arrow 120. The actuator arm 114 extends toward the storage platter 102 and the slider 116 is located at an end of the actuator arm 114 distal from the actuator spindle 118. The slider 116 flies in close proximity above the storage platter 102 while reading data from and/or writing data to the depicted top surface of the storage platter 102.

The storage platter 102 includes an array of embedded independent magnetic domains and the slider 116 includes an array of microelectronic components (e.g., a read element, a write element, thermal actuators, other head-media spacing micro-actuators, etc., not shown). The read elements are magneto-resistive, which allows them to read data from the magnetic domains as they pass underneath the read element. The write elements generate magnetic fields that selectively change polarity of the magnetic domains of the storage platter 102 as they pass underneath the write elements, which allows the write elements to write data to the storage platter 102. A flex cable 128 provides electrical connection paths from a controller SoC 131 to the various microelectronic components attached to the actuator arm 114 and the slider 116. The flex cable 128 transmits data signals from the read elements and/or to the write elements, while allowing pivotal movement of the actuator arm 114 during operation.

The storage platter 102 is laid out with a radial array of servo wedges (here, eight regularly spaced servo wedges, e.g., servo wedge 122) and data wedges (here, eight data wedges arranged between the servo wedges, e.g., data wedge 124). The servo wedges contain information regarding radial and tangential position of the slider 116 on the storage platter 102 and are written at uniformly spaced intervals around the circumference of the storage platter 102.

As the slider 116 passes over a servo wedge, the resulting read-back signal is demodulated by the controller SoC 131 to update the slider 116 position. The relative position of the slider 116 on the storage platter 102 is continuously updated by the controller SoC 131 so that read/write operations are reliably conducted at any location on the storage platter 102.

User-data stored within the HDD 100 is written to the data wedges oriented between the servo wedges on the storage platter 102. The written data is laid out in concentric tracks (e.g., track 104), of which there are millions per platter surface. Each data track spans an entire revolution of the storage platter 102, except for periodic interruptions by the servo wedges. Within a track, the user data is logically divided into sectors (e.g., track 104 may be divided into 12 sectors). A sector is the smallest unit of data that can be stored or requested by a host. Although 512-bytes has long been an established sector size, today's drives are moving towards 4096-byte sectors due to the inherent advantages afforded by longer error-correction block lengths. Further, other sector sizes are contemplated herein.

Typically, an integer number of sectors does not fit between servo wedges. To avoid wasting data storage space, some or all of the data sectors are split among multiple data wedges. For example, data sector 130 is illustrated as split between data wedges 124, 125. While data sector 130 is split into two data fragments 132, 134, in other implementations, data sectors can be split into many more fragments, particularly towards the inner diameter of the storage platter 102 where the data storage space between servo wedges is only about half its length towards the outer diameter of the storage platter 102.

Reading data sector 130 (or another data sector) on the storage platter 102 begins by re-positioning the transducer arm 114 such that slider 116 will pass directly over the location on the storage platter 102 where the data to be read is stored. As the slider 116 approaches the data sector 130, a constituent subsystem of the controller SoC 131 (a formatter) asserts a signal (also referred to as a read gate) to inform another subsystem of the controller SoC 131 (a read channel) of the impending operation.

More specifically, for the 2-fragment data sector 130, the first field encountered by the slider 116 is preamble 136, samples of which are used to synchronize the controller SoC 131 clock to the incoming signal. The controller SoC 131 then searches for a known data pattern that is used as a sync-mark (SM) 138, which is written immediately before the start of data fragment 0 132. When the SM 138 is detected, a relationship of the incoming read channel samples to the start of the data fragment 0 132 is known, thus allowing for the data fragment 0 132 to be demodulated and read.

Following the end of the data fragment 0 132, the read gate is turned off and the servo sector 140 is then encountered, which is used to confirm and adjust, as needed, the radial and tangential position of the slider 116 on the storage platter 102. When the preamble 142 is encountered following the servo sector 140, the read gate is turned back on and samples preamble 142 are again used to synchronize the controller SoC 131 clock to the incoming signal. The controller SoC 131 then again searches for another known data pattern that is used as an SM 144, which may be the same or a different data pattern from that of the SM 138. The SM 144 is written immediately before the start of data fragment 1 134. When the SM 144 is detected, a relationship of the incoming read channel samples to the start of the data fragment 1 134 is known, thus allowing for the data fragment 1 134 to be demodulated and read. The read results of data fragment 0 132 and data fragment 1 134 are then pieced together to read data sector 130, which may be subject to further subsequent error-correction.

Should some or all the data sector 130 be unreadable, an effective recovery technique for HDDs is sample averaging. As about 10% of the overall noise in the read-back signal differs from read to read when reading a sector multiple times, averaging the resulting samples provides an appreciable increase in signal-to-noise ratio (SNR) and, thus, a significant improvement in the ability to recover a sector. Recursive read averaging (RRA) is technique that applies significant hardware automation to the averaging procedure. Using RRA, samples for failed sector reads are stored in local on-chip memory (e.g., static random-access memory (SRAM)) along with unique identifiers (such as logical block addresses (LBAs)). When a sector is subsequently read with an LBA matching a stored sector, the samples are averaged through a Multiple-Input Multiple-Output (MISO) filter and the averaged sample is stored in SRAM replacing the prior sample. The updated and averaged samples are used for a decoding attempt and if unsuccessful, for use in subsequent averaging operations. Should the decoding attempt be successful, the memory used for saving the previously stored samples is freed up for use by other sectors.

Should one or both of the SMs 138, 144 be unreadable, mis-read, or read with low confidence, the data fragments 132, 134 are essentially unreadable, rendering the sector 130 also unreadable. Should that happen, the SM detection error recovery module 126 is used to recover missing SMs, disregard mis-read SMs, and/or or improve the confidence level in SMs for each of the data fragments 132, 134. When the data fragments 132, 134 are subsequently recombined, the confidence level in the overall sector 130 is also improved, which increases the likelihood of a successful read operation of the sector 130.

In other implementations, there may be two or more storage platters stacked and rotating together about the platter spindle 110. In such implementations, an actuator arm and its respective slider may be assigned to each of the stacked storage platters. For example, the actuator arm 114 and its respective slider 116 may read data from and/or write data to the storage platter 102, while another actuator arm and its respective slider may read data from and/or write data to another storage platter (not shown) stacked above or below the storage platter 102. In still further implementations, the HDD 100 includes a stacked array of any number of storage platters, each of which has an arm and a respective slider as described herein assigned to one or both surfaces (i.e., top and bottom surfaces) of the storage platters.

Appearances of the storage platter 102, actuator arm 114, and other features of the HDD 100 are for illustration purposes only and the features are not drawn to scale. The various microelectronic components attached to the slider 116 may be referred to in total as a transducer head. The presently disclosed technology may apply to rotating disc storage drive technologies other than the magnetic domain HDD 100 depicted in FIG. 1 (e.g., optical disc drives). Additional details regarding the SM detection error recovery module 126 and other features of the HDD 100 may be found elsewhere herein.

Figure 2:
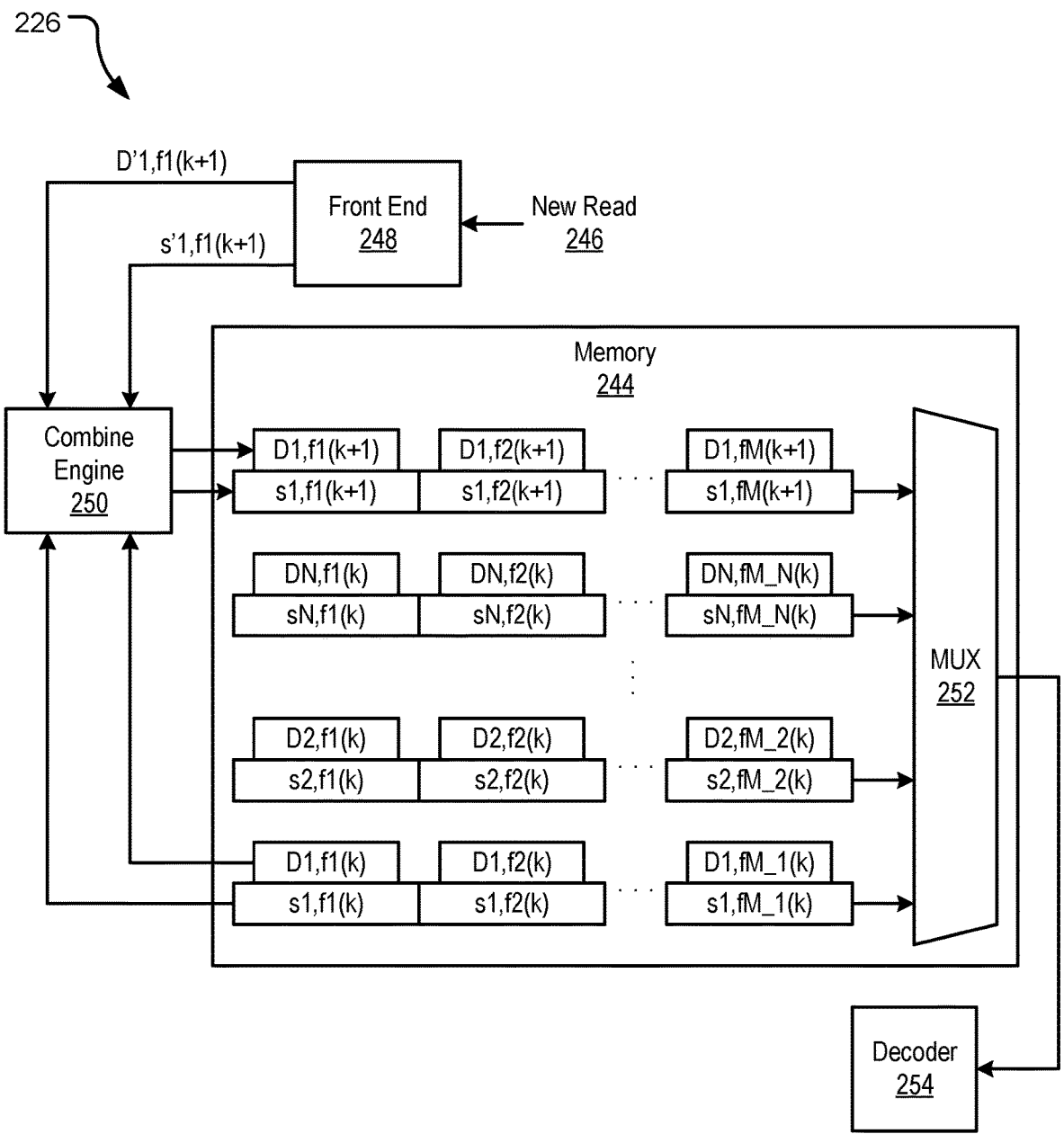
FIG. 2 illustrates an example SM detection error recovery module.

FIG. 2 illustrates an example SM detection error recovery module 226. The module 226 utilizes RRA as generally described above but applied to individual data segment fragments and including an SM detection indicator (e.g., status or reliability) for each fragment. Some or all data sectors stored on an HDD (e.g., HDD 100 of FIG. 1) may be broken down into multiple constituent data sector fragments (e.g., data fragments 132, 134 of FIG. 1), each of which have a corresponding SM (e.g., SMs 138, 144 of FIG. 1). The module 226 utilizes repeated read operations of the individual data segment fragments and their associated SMs to mitigate encountered SM detections failures and improve the sample quality of data sectors reads from an HDD.

Specifically, memory 244 (e.g., SRAM) includes an array of stored data fragments and an associated SM detection indicator for each stored data fragment. Stored samples of the data fragments and their associated LBAs are illustrated as s (sector) 1, 2, . . . N (sector identifier), wherein each sector i has M_i (fragment identifier) fragments 1_1, 2_1, . . . M_i, at time steps k, k+1, and so on without a capped maximum. Similarly, for each stored sample of a data fragment, an SM detection indicator is also stored, which is illustrated as D (detection status) for each s (sector) 1, 2, . . . N (sector identifier), wherein each sector i has M_i (fragment identifier) fragments 1_1, 2_1, . . . M_i, at time steps k, k+1, and so on without a capped maximum.

In various implementations, the SM detection indicator (D) may be an integer value that indicates whether or not the SM was detected reliably (e.g., "0" if the SM was not reliably detected and "1" if the SM was reliably detected). In cases where the SM was not at all detected, there may be a timing window for SM detection and a forced arbitrary SM at the end of the timing window to proceed with further read operations of additional data fragments. In this scenario, the forced SM is nearly surely incorrect (hence, an SM detection indicator value of "0"), but recording an arbitrary SM permits the module 226 to continue with the further read operations of the additional data fragments.

When a new read 246 is received at front end 248 with an LBA that matches a LBA of a data fragment stored in the memory 244, the new data fragment sample (s'1,f1(k+1)) and the new SM detection indicator (D'1,f1(k+1)) are combined at combine engine 250 with the existing stored sample of the same data fragment (s1,f1(k)) and its associated SM detection indicator (D1,f1(k)). This generates an updated (e.g., averaged) data fragment sample (s1,f1(k+1)) and its updated SM detection indicator (D1,f1(k+1)), which may replace the previously-stored data fragment (s1,f1(k)) and its associated indicator (D1,f1(k)) in the memory 244. Over time and multiple iterations of the combine engine 250, the stored data fragment samples and their associated SM detection indicators improve in sample quality and SM detections failures are mitigated through the use of RRA.

Stored data fragment samples and their associated SM detection indicators are fed through a memory multiplexer (MUX) 252, which outputs data fragment samples for decoder 254. In various implementations, the decoder 254 may use one or more of a low-density parity-check (LDPC) and a soft output Viterbi algorithm (SOVA) to ensure correct decoding. The output data fragment samples are then used for a decoding attempt using the decoder 254.

If a decoding attempt for a sector is unsuccessful, the unsuccessfully decoded data fragment samples and their associated SM detection indicators are maintained within the memory 244 for further quality mitigation using the combine engine 250. If the decoding attempt is successful, the decoded data may be returned to a host and the memory used to store the successfully decoded data fragment samples and their associated SM detection indicators may then be freed up for use by other data sector fragments for other sectors with SM detection failures.

Figure 3:
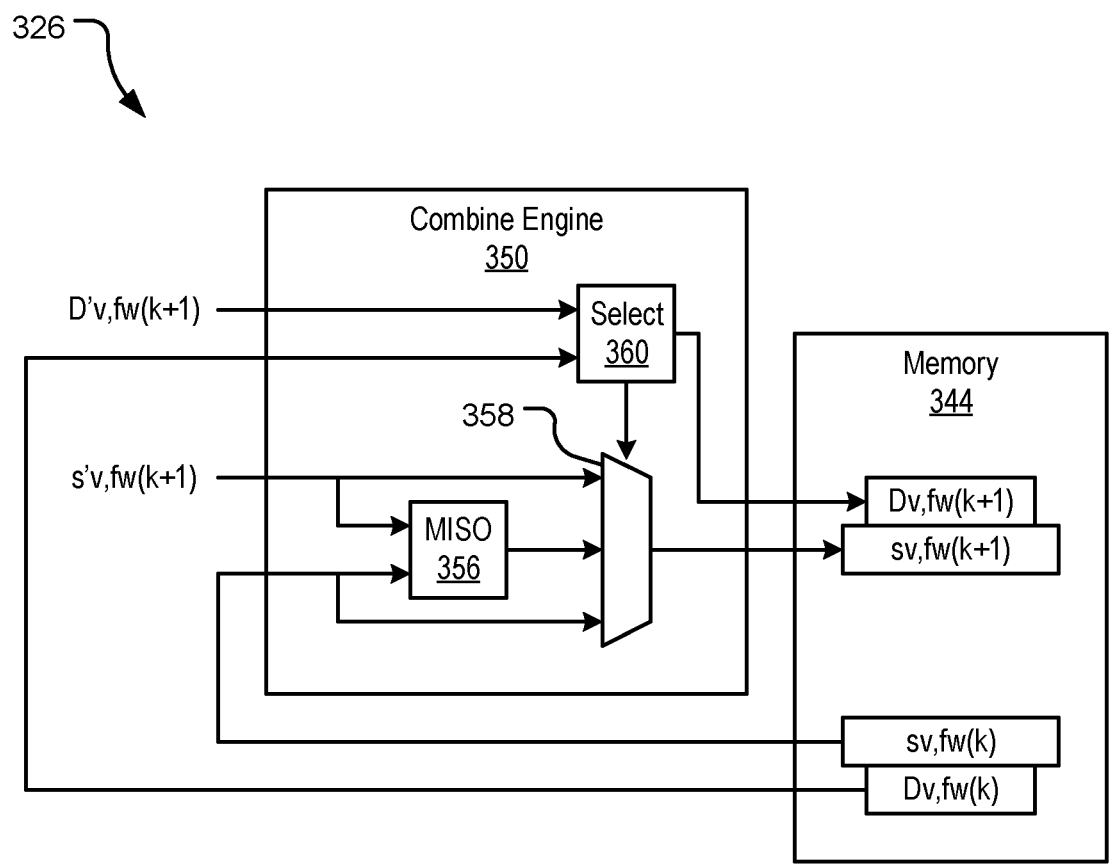
FIG. 3 illustrates another example SM detection error recovery module with a detail view of an associated combine engine.

FIG. 3 illustrates another example SM detection error recovery module 326 with a detail view of an associated combine engine 350. The module 326 utilizes RRA as generally described above. Some or all data sectors stored on an HDD (e.g., HDD 100 of FIG. 1) may be broken down into multiple constituent data sector fragments (e.g., data fragments 132, 134 of FIG. 1), each of which have a corresponding SM (e.g., SMs 138, 144 of FIG. 1). The module 326 utilizes repeated read operations of the individual data segment fragments and their associated SMs to mitigate encountered SM detections failures and improve the sample quality of data sectors reads from an HDD.

Specifically, memory 344 (e.g., SRAM) includes an array of stored data fragments and an associated SM detection indicator for each stored data fragment. Stored samples of the data fragments and their associated LBAs are illustrated as s (sector) v (sector identifier), f (fragment) w (fragment identifier) at time steps k, k+1, . . . . Further, for each stored sample of a data fragment, an SM detection indicator is also stored, which is illustrated as D (detection status) v (sector identifier), f (fragment) w (fragment identifier) at time steps k, k+1, . . . .

When a data fragment is read that does not have samples stored in the memory 344, the samples (s'v,fw(1)) and their corresponding SM detection indicator (D'v,fw(1)) may be directly sent to memory 344 (bypassing filter 356 by way of combine MUX 358). Provided there is sufficient free space available in the memory 344, and the decoding operation on the corresponding data sector is not successful, these values are stored in the memory 344 for used by the SM detection error recovery module 326.

When a new read is received with an LBA that matches a LBA of a data fragment stored in the memory 344, the new data fragment sample (s'v,fw(k+1)) and its associated SM detection indicator (D'v,fw(k+1)) are combined at combine engine 350 with the existing stored sample of the same data fragment (sv,fw(k)) and its associated SM detection indicator (Dv,fw(k)). More specifically, the new data fragment sample (s'v,fw(k+1)) and the existing stored sample of the same data fragment (sv,fw(k)) may be combined at a multiple input single output (MISO) filter 356 to obtain an averaged MISO output that is saved to the memory 344 in place of the existing stored sample of the same data fragment (sv,fw(k)) and its associated SM detection indicator (Dv,fw(k)). Alternatively, the new data fragment sample (s'v,fw(k+1)) may replace the existing stored sample of the same data fragment (sv,fw(k)) or the existing stored sample of the same data fragment (sv,fw(k)) may be maintained over the new data fragment sample (s'v,fw(k+1)). These choices are made by the selection engine 360, which is described in further detail below.

The new data fragment sample (s'v,fw(k+1)) and the existing stored sample of the same data fragment (sv,fw(k)), as well as their averaged MISO output, are fed into a combine MUX 358. The new SM detection indicator (D'v,fw(k+1)) and the existing SM detection indicator (Dv,fw(k)) are fed into a selection engine 360, which uses the SM detection indicators to select one of the new data fragment sample (s'v,fw(k+1)), the existing stored sample of the same data fragment (sv,fw(k)), and the averaged MISO output for storage in the memory 344 as the updated stored sample of the data fragment (sv,fw(k+1)) and its associated SM detection indicator (Dv,fw(k+1)). The data fragment samples and associated SM detection indicators are selected according to the values of the SM detection indicators for the incoming samples (D'v,fw(k+1)) and the stored samples (Dv,fw(k)) as discussed in further detail below with reference to FIGS. 4-5. Over time and multiple iterations of the combine engine 350, the stored data fragment samples and their associated SM detection indicators improve in sample quality and SM detections failures are mitigated through the use of RRA.

The SM detection error recovery module 326 may be used in conjunction with a variety of SM detection methods that output both the detected SM and a reliability indicator of the detected SM. For fragment w of sector v, reliable detection of an SM would set its indicator to 1 (D'v,fw(k+1)=1), whereas an unreliable detection of the SM would set its indicator to 0 (D'v,fw(k+1)=0). Should the SM be considered unreliable, the SM may be set to the location deemed to be its most likely position, however in other implementations, it may also be set to an arbitrary location. Irrespective of the SM reliability indicator, the ensuing channel operation may continue as normal in that its demodulation may consider the determined SM location as correct. In other words, the read operation may continue normally and not be aborted.

FIG. 4 illustrates a table 400 of example data fragments, each with an associated SM status indicator, stored in memory (e.g., memory 244 of FIG. 2) of an SM detection error recovery module (e.g., SM detection error recovery module 226 of FIG. 2). Each of the illustrated examples 1-4 represent data sector fragments (e.g., data fragments 132, 134 of FIG. 1) initially read from an HDD (e.g., HDD 100 of FIG. 1), each of which have a corresponding SM (e.g., SMs 138, 144 of FIG. 1). The module utilizes repeated read operations of the individual data segment fragments and their associated SM status indicators to mitigate encountered SM detection failures and improve the sample quality of data sectors reads from the HDD.

Each of Examples 1-4 illustrate what actions are to be taken in response to one of four respective scenarios, as described in detail below. For each of Examples 1-4, a new data fragment sample (s'v,fw(k+1)) and an existing stored sample of the same data fragment (sv,fw(k)), as well as their averaged MISO output, are fed into a combine MUX (not shown, see e.g., MUX 358 of FIG. 3)). A new SM status indicator (D'v,fw(k+1)) and an existing SM status indicator (Dv,fw(k)) are fed into a selection engine (not shown, see e.g., selection engine 360 of FIG. 3), which uses the SM status indicators to select one of the new data fragment sample (s'v,fw(k+1)) and the existing stored sample of the same data fragment (sv,fw(k)), and their averaged MISO output for storage in the memory as the updated stored sample of the data fragment (sv,fw(k+1)) and its associated SM status indicator (Dv,fw(k+1)). The data fragment samples and associated SM status indicators are selected according to the values of the SM status indicators for the incoming samples (D'v,fw(k+1)) and the stored samples (Dv,fw(k)).

Generally speaking, the module utilizes data fragment samples when their associated SM status indicator specifies a correctly detected SM (illustrated as "1"). In Example 1, the module uses both data fragment samples (s'v,fw(k+1) and (sv,fw(k)) as their associated SM status indicators (D'v,fw(k+1) and (Dv,fw(k)) both specify correctly detected SMs. Thus, the output of the MISO filter (miso_out) and its associated correctly detected SM status indicator (Dv,fw(k+1)) is chosen for storage in memory (sv,fw(k+1)) to take advantage of the SNR improvement afforded by sample averaging.

In Examples 2 and 3, only the incoming or stored data fragment samples (s'v,fw(k+1) and (sv,fw(k)), respectively, have indicated a correctly detected SM (D'v,fw(k+1) and Dv,fw(k), respectively). Therefore, the data fragment samples may not be correctly aligned for the purpose of sample averaging. Further, combining unaligned data fragment samples may corrupt the MISO filter output. As such, the data fragment samples associated with the correctly detected SM (s'v,fw(k+1) for Example 2 and sv,fw(k) for Example 3) are chosen for storage in the updated memory. In all of Examples 1-3, the selections of the data fragment samples are each associated with correctly detected SMs and, thus, the newly stored SM status indicator value (Dv,fw(k+1)) also specifies a correctly detected SM (illustrated as "1").

In Example 4, neither of the incoming and the stored data fragment samples (s'v,fw(k+1) and (sv,fw(k)) have indicated a correctly detected SM (D'v,fw(k+1) and Dv,fw(k)). Although the data fragment samples are not reliable, Example 4 defaults to selecting the incoming data fragment sample (s'v,fw(k+1) for storage in the updated memory. Other implementations may default to maintaining the existing stored sample of same data fragment (sv,fw(k)) in the updated memory. As neither of the incoming and the stored data fragment samples have indicated a correctly detected SM, the updated SM status indicator value (Dv,fw(k+1)) also specifies an undetected SM (illustrated as "0").

In sum, if a re-read of a data fragment is able to reliably detect the SM, the associated data segment sample will be stored and utilized for a subsequent error-correction attempt. If a re-read of that data fragment was unable to reliably detect the SM, a potentially correct data fragment sample previously stored in the memory may be replaced by an incorrect data fragment sample, which may be problematic. Further, there is a possibility of false detection (declaring an SM correct when, in fact, it was not correctly detected), which may also be problematic. In Examples 1-4, once a data fragment sample is indicated to have a correctly detected SM, the data fragment sample will continue to propagate within the memory (either through averaging or through selection) and, therefore, the incorrect data fragment sample will never be rectified. If a SM reliability indicator is available in place of the SM status indicator, these shortcomings of Examples 1-4 may be addressed, as discussed below with reference to table 500 of FIG. 5.

Figure 5:
FIG. 5 illustrates a table of example data fragments, each with an associated SM detection status and reliability, stored in memory of an SM detection error recovery module.

FIG. 5 illustrates a table of example data fragments 500, each with an associated SM detection reliability indicator, stored in memory of an SM detection error recovery module. Each of the illustrated Examples 1-5 represent data sector fragments (e.g., data fragments 132, 134 of FIG. 1) initially read from an HDD (e.g., HDD 100 of FIG. 1), each of which have a corresponding SM (e.g., SMs 138, 144 of FIG. 1). The module utilizes repeated read operations of the individual data segment fragments and their associated SM reliability indicators to mitigate encountered SM detection failures and improve the sample quality of data sectors reads from the HDD.

Each of Examples 1-5 illustrate what actions are to be taken in response to one of five respective scenarios, as described in detail below. For each of Examples 1-5, a new data fragment sample (s'v,fw(k+1)) and an existing stored sample of the same data fragment (sv,fw(k)), as well as their averaged MISO output, are fed into a combine MUX (not shown, see e.g., MUX 358 of FIG. 3)). An SM reliability indicator (D'v,fw(k+1)) and an existing SM reliability indicator (Dv,fw(k)) are fed into a selection engine (not shown, see e.g., selection engine 360 of FIG. 3), which uses the SM reliability indicators to select one of the new data fragment sample (s'v,fw(k+1)), the existing stored sample of the same data fragment (sv,fw(k)), and the averaged MISO output for storage in the memory as the updated stored sample of the data fragment (sv,fw(k+1)) and its associated SM reliability indicator (Dv,fw(k+1)). The data fragment samples and associated SM reliability indicators are selected according to the values of the SM reliability indicators for the incoming sample (D'v,fw(k+1)) and the stored sample (Dv,fw(k)).

As compared to the Examples 1-4 of FIG. 4, the Examples 1-5 of FIG. 5 use an additional SM reliability metric associated with each data fragment sample and its detected SM rather than a single bit status metric that merely indicates a correctly detected or the absence thereof (e.g., "1" or "0" of FIG. 4, respectively). For each incoming read of a new data fragment sample, a number is assigned to D'v,fw(k+1) within a reliability range of 0-100, where 100 indicates complete confidence in the detected SM and 0 indicates complete confidence that detected SM is incorrect. Further, if the SM is missing or otherwise not detected, a 0 is also assigned. While 0-100 is a convenient reliability range to describe with reference to Examples 1-5, any range beyond a binary option may be used for Examples 1-5.

When a read operation is performed for a data fragment with no sample stored in memory, the incoming sample (s'v,fw(1)) is stored in memory and the SM reliability indicator is set to the incoming SM reliability indicator value (D'v,fw(1)). When a read operation is performed for a data fragment with a sample already stored in the memory, the data fragment sample selection and SM reliability indicator update in memory is performed as a function of two thresholds (T1, T2). The two thresholds (T1, T2) may differ so that incoming data fragments may be subject to a different threshold than previously stored data fragments, or vice versa, to prioritize one type of data fragment over the other. In some implementations, there is no priority and T1 is set equal to T2.

In Example 1, both the incoming and stored samples have sufficient reliability in that D'v,fw(k+1) is greater than or equal to T1 and Dv,fw(k) is greater than or equal to T2. Accordingly, the incoming data fragment sample (s'v,fw(k+1)) and the previously stored data fragment sample (sv,fw(k)) are combined through the MISO filter to store a updated stored data fragment sample equal to an output from the MISO filter (miso_out). An SM reliability indicator update (Dv,fw(k+1)) is specified as a function f(x) of each of the incoming and previously stored reliability indicators (f(D'v,fw(k+1),Dv,fw(k))). Variations of the function f(x) are described below.

In one example, the resulting updated SM reliability indicator may reflect the probability that both SM detections were correct and, therefore, may be set equal to the product of the incoming and previously stored indicators (f(D'v,fw(k+1),Dv,fw(k))=(D'v,fw(k+1)×Dv,fw(k)/100)). In another example, it is unlikely to detect an SM with absolute certainty. Accordingly, each subsequent SM update will decrease the updated SM reliability indicator value after each averaging operation. The SM reliability indicator, therefore, will eventually drop below T2, which will periodically flush the averaged output from the MISO filter from the memory, which may or may not be acceptable. In an implementation where an erroneous data fragment sample was inadvertently included as an input to the MISO filter, over time, the erroneous data fragment sample (and all other combined data fragment samples) will be flushed from memory when the indicator eventually drops below T2, which may be a favorable result.

Another workable function is the minimum value with a subtracted bias (B) (f(D'v,fw(k+1),Dv,fw(k))=(min(D'v,fw(k+1),Dv,fw(k))−B)). Using a minimum value function with a subtracted bias (B) offers the advantage of periodically purging data fragment samples from memory in favor of an incoming data fragment, where the frequency of this purge depends on how marginal the previous SMs were and the selected bias (B). The bias (B) is an integer value that may be selected to fine tune the frequency of purging samples from the memory. Another example solution sets the thresholds (T1, T2) as functions of the read number (T1(k), T2(k)), where the thresholds would increase with k to increase the likelihood that the previously stored data fragment samples drop below the thresholds with subsequent reads. If periodically flushing the samples from memory is unacceptable, another example workable function is the minimum value (f(D'v,fw(k+1),Dv,fw(k))=min(D'v,fw(k+1),Dv,fw(k)). Other workable functions are contemplated herein.

In Examples 2 and 3, only the reliability of either the incoming data fragment sample (s'v,fw(k+1)) (Example 2) or the stored data fragment sample (sv,fw(k)) (Example 3) meet the specified reliability criteria (T1, T2, respectively) and, thus, only the sufficiently reliable data fragment sample is selected for updated storage in memory as sv,fw(k+1). The SM reliability indicator associated with the sufficiently reliable data fragment sample is stored as Dv,fw(k+1). In Examples 4 and 5, neither SM reliability indicator is of sufficient reliability, thus, the data fragment sample with higher reliability is selected for an updated storage in memory as sv,fw(k+1). The SM reliability indicator associated with the data fragment sample having higher reliability is stored as Dv,fw(k+1).

In prior art systems, it is typical to declare an SM undetected if it was not observed with sufficient reliability. However, this discards information that could potentially be useful. For example, an SM detected with a 50% probability of being correct would typically be deemed insufficient and, thus, a missed SM would be declared. In the presently disclosed technology, an SM is selected that has the highest reliability using an indicator comparison operation, even if that reliability is below the applicable threshold (T1, T2). As such, the SM would always be detected, albeit, with low reliability in some instances. In Example 4, D'v,fw(k+1) is greater than or equal to Dv,fw(k), thus D'v,fw(k+1) and s'v,fw(k+1) are selected for updated memory. In Example 5, D'v,fw(k+1) is less than Dv,fw(k), thus Dv,fw(k) and sv,fw(k) are selected for updated memory.

In an implementation where the SM was deemed to be of low reliability for both the incoming and stored data fragment samples, the indicator comparison operation uses the reliability of each detection to maximize the probability of successful decoding. In an implementation where an incorrect SM detection was deemed as being of high reliability, an appropriate selection of the SM reliability indicator update function f(x) and/or using thresholds (T1, T2) that change with advancing read numbers, stored data fragment samples and their respective SMs may be purged from memory over time even if their reliability was sufficiently high, which allows for recovery from incorrect SM detections.

Figure 6:
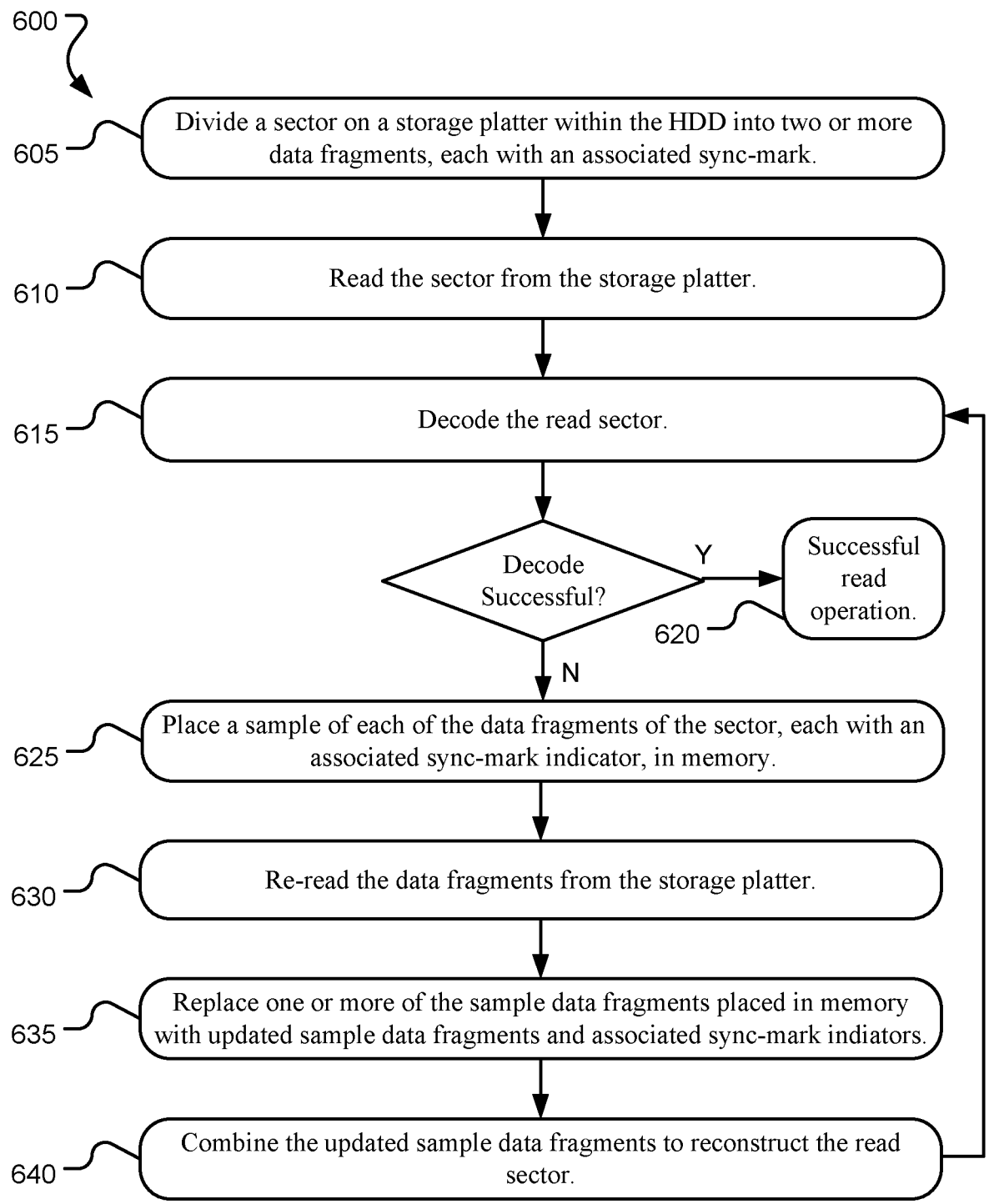
FIG. 6 illustrates example operations for performing a data recovery method for an HDD.

FIG. 6 illustrates example operations 600 for performing a data recovery method for a hard disc drive (HDD). A dividing operation 605 divides a sector on a storage platter within the HDD into one or more data fragments, each with an associated SM. Some or all of the sectors on the storage platters within the HDD may be similarly divided into data fragments, due in part to placement of servo wedges on each storage platter in relation to the location of the sectors on the storage platter.

A reading operation 610 reads the sector from the storage platter and a decoding operation 615 decodes the read sector. Should the decoding operation 615 be successful, further data recovery may not be necessary and the read operation is successful 620. However, should the decoding operation 615 be unsuccessful, a placing operation 625 places a sample of each of the data fragments of the sector, each with an associated SM detection indicator, in memory. In some implementations, the SM detection indicators are binary status indicators of the SM as either reliably detected, or not. In other implementations, the SM detection indicators are selected within a range that indicates relatively reliability of the detected SM. The SM reliability indicator ranges from completely reliably detected, to completely unreliably detected (or not at all detected).

A re-reading operation 630 re-reads the data fragments from the storage platter. As many read errors do not propagate from read-to-read, the re-reading operation 630 may achieve a different result from the first reading operation 610. A replacing operation 635 replaces one or more of the sample data fragments placed in memory with updated sample data fragments and associated SM detection indicators based on the re-read data fragments. The replacing operation 635 utilizes the SM detection error recovery module described in detail herein to determine which sample data fragments to update, and in what manner. In various implementations, SM detection indicators (indicating status or reliability) are updated along with their respective sample data fragments as described herein.

A combining operation 640 combines the updated sample data fragments. The combining operation 640 reconstructs the read sector based on updated information within sample data fragments, which yields a potentially more accurate read of the sector. The decoding operation 615 is then repeated in another attempt to decode the sector. Should the decoding operation 615 be successful, further data recovery may not be necessary and the read operation is successful 620. Following a successful recovery of a sector, the corresponding data fragments may be flushed from the memory to make room for data fragments of other sector flagged for data recovery. Should the decoding operation 615 be unsuccessful, operations 625, 630, 635, 640 repeat. Operations 600 may continue iteratively to correct SM errors over time.

The methods described herein afford significant advantages to error-recovery operations as SM detection failures are seamlessly handled by the SM detection error recovery module without requiring specific customized attention and without substantial firmware involvement. Further, leveraging RRA effectively allows for the efficient recovery of fragments affected by SM detection errors in conjunction with sample SNR improvement for unaffected data fragments. As a result, other error-recovery operations may continue independently without regard to SM detection failures. For example, modifying the radial position of the read head, which may cause previous marginally correct SM detections to fail and/or cause previous SM detection failures to succeed are all seamlessly managed by the SM detection error recovery module hardware. Further, the methods disclosed herein allows for SM detection failures to be handled within CCT limitations.

Figure 7:
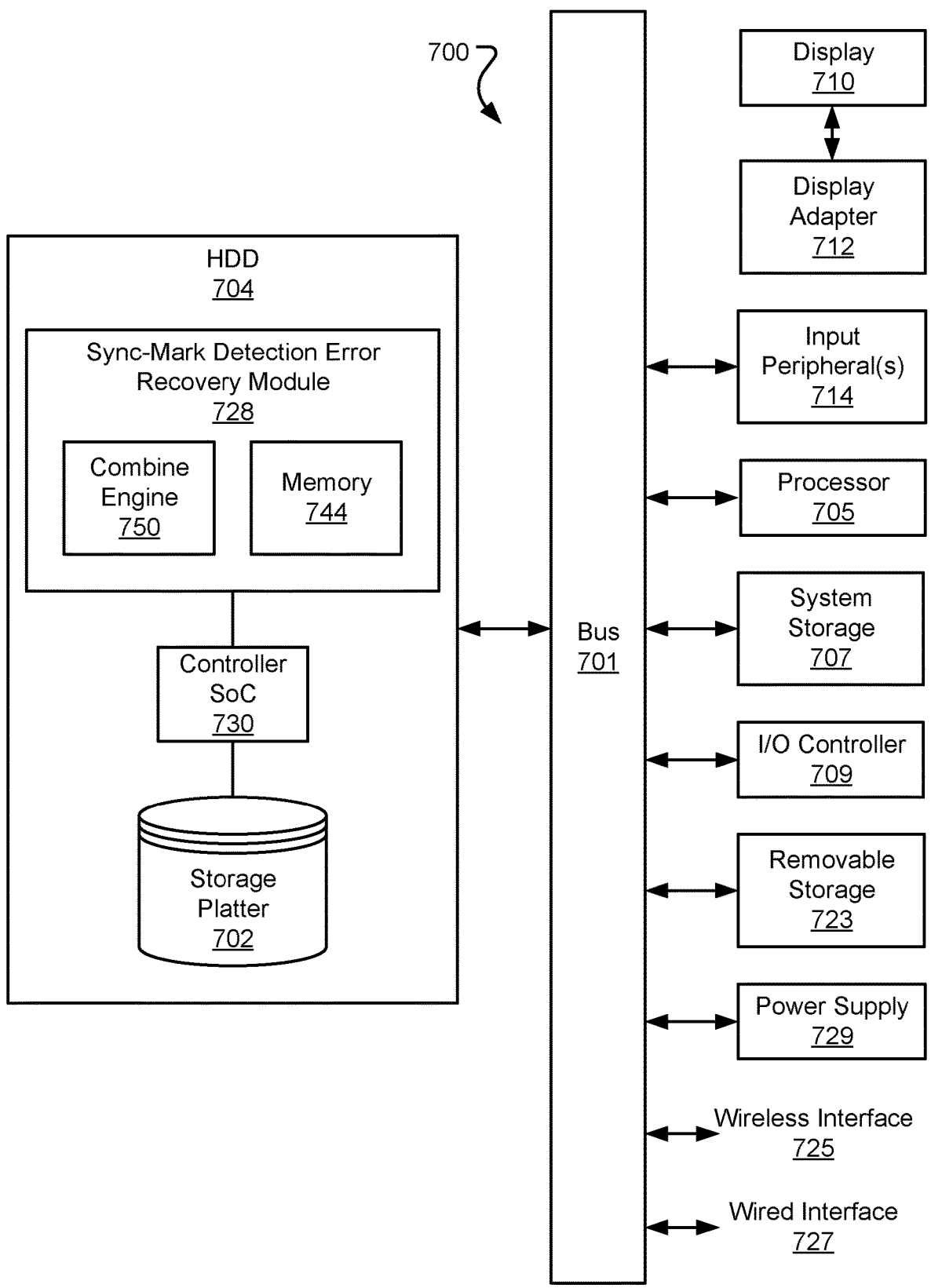
FIG. 7 illustrates an example system diagram of a computer system suitable for implementing a data recovery method for an HDD.

FIG. 7 illustrates an example system diagram of a computer system 700 (e.g., a network server) suitable for implementing a data recovery method for a hard disc drive (HDD) 702. The HDD 702 includes a series of storage media platters (e.g., storage media platter 702), each of which is accessible via a controller SoC 730. The HDD 702 further includes an SM detection error recovery module 728, which in turn includes a combine engine 750 and memory 744. The SM detection error recovery module 728 executes the operations described herein to recover data when SMs are unreadable or unreliably read.

The computer system 700 manages access to the storage drive 702, which includes recovering data that is initially unsuccessfully decoded from the HDD 702. The computer system 700 includes a bus 701, which interconnects major subsystems such as a processor 705, system storage 707 (such as random-access memory (RAM) and read-only memory (ROM)), an input/output (I/O) controller 709, removable storage (such as a memory card) 723, a power supply 729, and external devices such as a display screen 710 via a display adapter 712, and various input peripherals 714 (e.g., a mouse, trackpad, keyboard, touchscreen, joystick, and/or smart card acceptance device). Wireless interface 725 together with a wired network interface 727, may be used to interface to the data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 7 to be present to practice the presently disclosed technology. Furthermore, devices and components thereof may be interconnected in different ways from that shown in FIG. 7. Code (e.g., computer software, including mobile applications (apps) to implement the presently disclosed technology may be operably disposed in the system storage 707, removable storage 723, and/or the storage drive 704.

The computing system 700 may include a variety of tangible computer-readable storage media (e.g., the system storage 707, the removable storage 723, the storage drive 704, and the memory 744) and intangible computer-readable communication signals. Tangible computer-readable storage can be embodied by any available media that can be accessed by the computing system 700 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information and which can be accessed by the computing system 700.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the invention, the presently disclosed technology resides in the claims hereinafter appended. Furthermore, structural features of the different implementations may be combined in yet another implementation without departing from the recited claims.

What is claimed is:

1. A data recovery method for a hard disc drive (HDD) comprising:
dividing a sector on a storage platter within the HDD into one or more data fragments, each with an associated sync-mark (SM);
reading the sector from the storage platter, wherein a decoding operation on the sector fails;
placing a sample of each of the data fragments, each with the associated SM, in memory;
re-reading the data fragments from the storage platter; and
replacing one or more of the sample data fragments with updated sample data fragments based on the re-read data fragments in the memory.

2. The data recovery method of claim 1, further comprising:
combining the updated sample data fragments; and
decoding the sector using the combined updated sample data fragments.

3. The data recovery method of claim 1, further comprising:
selecting an SM status indicator of a correctly detected SM for each of the updated sample data fragments where one or both of:
an SM status indicator of a correctly detected SM for a sample data fragment placed in memory is present; and
an SM status indicator of a correctly detected SM for a re-read sample data fragment is present.

4. The data recovery method of claim 1, should an SM reliability indicator for both a sample data fragment placed in memory and a re-read sample of the data fragment both rise above a threshold, the method further comprising:

selecting an updated SM reliability indicator for the updated sample data fragment as a function of both of:
the SM reliability indicator for the sample data fragment placed in memory; and
the SM reliability indicator for the re-read sample data fragment.

5. The data recovery method of claim 1, should an SM reliability indicator for a sample data fragment placed in memory fall below a threshold and an SM reliability indicator for a re-read sample of the data fragment rise above the threshold, the method further comprising:
selecting an updated SM reliability indicator for an updated sample data fragment matching that of an SM reliability indicator for the re-read sample of the data fragment.

6. The data recovery method of claim 1, should an SM reliability indicator for a sample data fragment placed in memory rise above a threshold and an SM reliability indicator for a re-read sample of the data fragment rise fall below the threshold, the method further comprising:
selecting an updated SM reliability indicator for an updated sample data fragment matching that of an SM reliability indicator for the sample data fragment placed in memory.

7. The data recovery method of claim 1, should both an SM reliability indicator for a sample data fragment placed in memory and an SM reliability indicator for a re-read sample of the data fragment fall below a threshold, the method further comprising:
selecting an updated SM reliability indicator for an updated sample data fragment matching that of the greater one of the SM reliability indicator for the sample data fragment placed in memory and the SM reliability indicator for the re-read sample of the data fragment.

8. The data recovery method of claim 1, wherein the sample data fragments placed in memory are replaced with samples of the re-read data fragments for sample data fragments placed in memory, where an SM was not correctly detected for either of the samples of the re-read data fragments and the sample data fragments placed in memory.

9. The data recovery method of claim 1, wherein the sample data fragments placed in memory are replaced with recursive read averages of the sample data fragments placed in memory and the samples of the re-read data fragments, where SMs for both the sample data fragments placed in memory and the samples of the re-read data fragments were correctly detected.

10. The data recovery method of claim 1, wherein the re-reading and replacing operations are iteratively repeated to update the sample data fragments.

11. A hard disc drive (HDD) comprising:
a storage platter divided into sectors, wherein a sector is further divided into one or more data fragments, each with an associated sync-mark (SM);
a controller to:
read the sector from the storage platter;
attempt and fail in decoding the read sector; and
re-read data fragments comprising the sector from the storage platter;
an SM detection error recovery module to:
place a sample of each of the read data fragments, each with the associated SM, in memory; and
replace one or more of the sample data fragments with updated sample data fragments based on the re-read data fragments in the memory.

12. The HDD of claim 11, wherein the SM detection error recovery module is further to combine the updated sample data fragments and the controller is further to decode the sector using the combined updated sample data fragments.

13. The HDD of claim 11, wherein the SM detection error recovery module is further to:
select an SM status indicator of a correctly detected SM for each of the updated sample data fragments where one or both of:
an SM status indicator of a correctly detected SM for a sample data fragment placed in memory is present; and
an SM status indicator of a correctly detected SM for a re-read sample data fragment is present.

14. The HDD of claim 11, should an SM reliability indicator for both a sample data fragment placed in memory and a re-read sample of the data fragment both rise above a threshold, wherein the SM detection error recovery module is further to:
select an updated SM reliability indicator for the updated sample data fragment as a function of both of:
the SM reliability indicator for the sample data fragment placed in memory; and
the SM reliability indicator for the re-read sample data fragment.

15. The HDD of claim 11, should an SM reliability indicator for a sample data fragment placed in memory fall below a threshold and an SM reliability indicator for a re-read sample of the data fragment rise above the threshold, wherein the SM detection error recovery module is further to:
select an updated SM reliability indicator for an updated sample data fragment matching that of an SM reliability indicator for the re-read sample of the data fragment.

16. The HDD of claim 11, should an SM reliability indicator for a sample data fragment placed in memory rise above a threshold and an SM reliability indicator for a re-read sample of the data fragment rise fall below the threshold, wherein the SM detection error recovery module is further to:
select an updated SM reliability indicator for an updated sample data fragment matching that of an SM reliability indicator for the sample data fragment placed in memory.

17. The HDD of claim 11, should both an SM reliability indicator for a sample data fragment placed in memory and an SM reliability indicator for a re-read sample of the data fragment fall below a threshold, wherein the SM detection error recovery module is further to:
select an updated SM reliability indicator for an updated sample data fragment matching that of the greater one of the SM reliability indicator for the sample data fragment placed in memory and the SM reliability indicator for the re-read sample of the data fragment.

18. The HDD of claim 11, wherein the sample data fragments placed in memory are replaced with samples of the re-read data fragments for sample data fragments placed in memory, where an SM was not correctly detected for either of the samples of the re-read data fragments and the sample data fragments placed in memory.

19. The HDD of claim 11, wherein the sample data fragments placed in memory are replaced with recursive read averages of the sample data fragments placed in memory and the samples of the re-read data fragments, where SMs for both the sample data fragments placed in memory and the samples of the re-read data fragments were correctly detected.

20. One or more computer-readable storage media encoding computer-executable instructions for executing on a computer system a data recovery computer process for a hard disc drive (HDD), the computer process comprising:

dividing a sector on a storage platter within the HDD into one or more data fragments, each with an associated sync-mark (SM);

reading the sector from the storage platter, wherein a decoding operation on the sector fails;

placing a sample of each of the data fragments, each with the associated SM, in memory;

re-reading the data fragments from the storage platter; and replacing one or more of the sample data fragments with updated sample data fragments based on the re-read data fragments in the memory.

* * * * *